United States Patent [19]

Kline

[11] 4,109,448
[45] Aug. 29, 1978

[54] METHOD AND APPARATUS FOR IN-FIELD PROCESSING OF VEGETATION

[75] Inventor: Donald C. Kline, Allentown, Pa.

[73] Assignee: Schoeneck Farms, Inc., Nazareth, Pa.

[21] Appl. No.: 713,349

[22] Filed: Aug. 11, 1976

[51] Int. Cl.$^2$ .......................................... A01D 43/00
[52] U.S. Cl. ........................................ 56/13.5; 56/1; 100/37
[58] Field of Search ................ 56/1, 12, 2, 13.5, 14.5, 56/14.6, DIG. 2, 341; 100/104, 94, 37, 38, 88; 425/DIG. 230, DIG. 16, 331, 305.1

[56] References Cited

U.S. PATENT DOCUMENTS

| | | | |
|---|---|---|---|
| 1,053,172 | 2/1913 | Hendryx | 100/94 |
| 3,023,559 | 3/1962 | Richey et al. | 56/1 |
| 3,394,664 | 7/1968 | Roll | 425/382 |
| 3,425,362 | 2/1969 | Lundell | 425/305.1 |
| 3,430,583 | 3/1969 | Pool et al. | 56/1 X |
| 3,613,335 | 10/1971 | Forth | 56/1 |

Primary Examiner—Russell R. Kinsey
Attorney, Agent, or Firm—Howson & Howson

[57] ABSTRACT

Apparatus carried on a self-propelled vehicle field processes alfalfa to obtain therefrom fiber and protein components and a deproteinized liquid component which is simultaneously applied on the field as the vehicle advances. The apparatus includes a harvesting head assembly which is mounted on the front of the vehicle to cut the alfalfa and means to convey the alfalfa rearwardly to a macerator which shreds the harvested alfalfa. The macerated alfalfa is separated into fibrous and liquid fractions by a dewatering press which is connected to the macerator by a conveyor. The fibrous fraction is blown rearwardly into a trailer pulled behind the vehicle. The liquid fraction is heated to a predetermined temperature and is pumped into a holding tank wherein the protein in the liquid coagulates and floats on the deproteinized liquid. The protein is skimmed from the deproteinized liquid and is collected in a storage container mounted on the vehicle. The deproteinized liquid is applied on the ground beneath the vehicle by a sprayer assembly.

A method for in-field processing of alfalfa is disclosed.

A specially-designed macerator and dewatering press are disclosed.

23 Claims, 11 Drawing Figures

METHOD AND APPARATUS FOR IN-FIELD PROCESSING OF VEGETATION

FIELD OF THE INVENTION

The present invention relates to a method and apparatus for field-processing vegetation. More particularly, the present invention relates to methods and apparatus for field-processing green-plant vegetation to obtain plant protein and fiber and a deproteinized liquid which is simultaneously discarded on the field.

BACKGROUND OF THE INVENTION

Dehydrated alfalfa is used as a supplement in livestock feed. The dehydrated alfalfa is customarily obtained by a process which involves harvesting alfalfa, hauling the harvested alfalfa to a centrally-located processing plant, heating the alfalfa at the plant to evaporate moisture therefrom, and then pelletizing the alfalfa. The alfalfa is usually dehydrated in rotary kilns which are heated by the combustion of fossil fuels such as oil or natural gas. A significant amount of thermal energy is required to dehydrate the alfalfa in this manner. Hence, with increasing constraints on the supply of fossil fuels, it should be apparent that the cost to produce dehydrated alfalfa by this process will continue to bear a direct relation to the cost of fuel.

Conventionally, alfalfa to be dehydrated is harvested by a self-propelled vehicle which cuts the alfalfa and collects the same in a hopper carried on the vehicle or in a trailer towed behind the vehicle. Although this procedure has the advantage of minimizing mechanical handling of the alfalfa in the field, it requires a substantial amount of energy simply to haul the relatively heavy, moisture-laden alfalfa to the processing plant. Also, the restrictions on the physical size of vehicles which can be used to haul alfalfa on the roads makes it desirable for the alfalfa to be compacted as much as possible for hauling in order to minimize the number of trips required to transport a given weight of alfalfa from the field to the processing plant.

The amount of moisture in the alfalfa can be reduced by sun-drying or field-wilting techniques. These techniques involve cutting the alfalfa, tedding the alfalfa, and gathering the alfalfa after it has dried to the desired moisture level. Although this procedure utilizes free solar energy to evaporate moisture from the alfalfa, solar energy does not provide a reliable source of heat because of the vagaries of the weather. Moreover, this technique is also less efficient since it involves greater mechanical handling of the alfalfa and hence more labor than the conventional procedure.

It is known that mechanical handling of dried alfalfa can cause substantial field losses of valuable plant matter. For instance, as the alfalfa dries, its leaves become brittle. Brittle leaves are easily shattered by mechanical manipulation. As much as 10-20% of the alfalfa plant may be lost from mechanical handling. Also, 5-10% of the dry plant matter can be lost by respiration after cutting. Since the leaves are an important part of the alfalfa plant containing the most protein and the least fiber, it should be apparent that these losses should be avoided where possible.

In addition to the losses due to mechanical handling, sun-drying of alfalfa is known to cause a deterioration in the carotene and xanthophyll content of the alfalfa. These components, together with protein, are normally guaranteed in the analysis of dehydrated alfalfa. Accordingly, it should be apparent that a process whereby a high-quality dehydrated alfalfa product can be produced efficiently is highly desirable.

In recent years, some experimental work has been conducted to demonstrate the practicality of processes for extracting protein concentrates from the alfalfa plant. In these processes, harvested alfalfa is transported to a processing plant where the alfalfa is macerated and pressed to separate the alfalfa into a fibrous fraction and a liquid fraction. The fibrous fraction is retained and dehydrated or used as ensilage, etc. The liquid fraction is heated to a predetermined temperature to cause the plant protein contained therein to coagulate and form a cheeselike curd which floats on a whey or brown juice. The curd is rich in protein, low in fiber content, and high in xanthophyll and carotene. The curd is, therefore, economically valuable as a feed supplement for non-ruminant animals, and especially poultry. For a more detailed description of the above processes, reference is made to the following articles:

*Crops and Soils Magazine*, August-September, 1973, pages 12-13; *Report of Fifth Annual Alfalfa Symposium* held on Apr. 8, 1975, in Hershey, Pa.; *Technical and Ergonomic Aspects of the Production of Alfalfa Silage by Fractionation*, paper given at the Eighth International Congress of Agricultural Engineering held in The Netherlands on September 23-29, 1974, by Bouhn, Koegel, Schirer, and Fromin; and a Report entitled *On the Farm Production of Alfalfa Juice Protein* by Bouhn and Koegel presented at the American Society of Agricultural Engineers Plant Juice Seminar at Madison, Wisconsin on Apr. 27, 1974.

Although the processes described in the above articles are capable of extracting valuable components from alfalfa, they have several limitations. For instance, the processes are performed at a stationary plant location. Thus, the alfalfa (and the water contained therein) must be hauled to the plant, and this involves the expenditure of substantial amounts of labor and energy. In addition, these processes generate substantial quantities of deproteinized brown juice or whey which must be discarded in an environmentally-satisfactory manner.

OBJECTS OF THE INVENTION

With the foregoing in mind, it is a primary object of the present invention to provide a novel method and apparatus for enabling high-quality dehydrated alfalfa and alfalfa silage to be produced efficiently.

Another object of the present invention is to provide an improved method and apparatus for producing dehydrated alfalfa which is rich in carotene and xanthophyll.

A further object of the present invention is to provide a method and apparatus for enabling high quality dehydrated alfalfa to be produced substantially independent of weather conditions.

It is another object of the present invention to provide a unique method and apparatus for field-processing alfalfa to obtain a fibrous fraction and liquid fraction having a protein component which is retained and a deproteinized liquid component which is applied onto the field during processing.

A still further object of the present invention is to provide alfalfa-processing apparatus which is sufficiently compact and light in weight as to be capable of being carried on a self-propelled vehicle.

Another object of the present invention is to provide an improved macerator which is of simple but rugged construction and which functions to achieve effective cell rupture of legumes such as alfalfa.

As a still further object, the present invention provides an improved dewatering press which is light in weight, compact and which is capable of expressing a maximum amount of liquid from green plant vegetation such as alfalfa or other legumes.

SUMMARY OF THE INVENTION

More specifically, the present invention provides a method and apparatus for in-field processing of green plant vegetation, including legumes such as alfalfa. The apparatus performs a method comprising the steps of harvesting the alfalfa with a self-propelled harvester, processing the harvested alfalfa in equipment carried on the harvester to obtain a liquid fraction and a fibrous fraction, separating the liquid fraction into a protein-rich curd component and a deproteinized whey component rich in growth-promoting chemical compounds by heating the liquid fraction and holding the heated liquid in a fractionating tank, collecting the fibrous fraction and the curd, and applying the whey onto the field as the vehicle advances to fertilize the field during harvesting and processing of the alfalfa.

The present invention provides specially designed rotary extrusion apparatus for macerating the alfalfa plants. The extrusion apparatus comprises a frame, a die ring carried by the frame, bearing means supported by the frame around the periphery of the die ring to mount the die ring for rotation relative to the frame, roller means disposed in the die ring for extruding alfalfa outwardly through peripheral orifices in the die ring, means for rotating the roller means, and means coupling the die ring to the roller means so that the die ring rotates in synchronism with the roller means. A shroud surrounds the die ring to collect macerated alfalfa, and impeller means between the shroud and the die ring causes the macerated alfalfa to be discharged from an outlet in the shroud as the die ring rotates.

The present invention also provides an improved dewatering press for separating the macerated alfalfa into fibrous and liquid fractions. The dewatering press comprises a pair of conical pressure members, means mounting the pressure members for rotation about obtusely-intersecting horizontal axes, means to rotate the pressure members, deflector vane means disposed between the pressure members operable to expel alfalfa fiber from between the press members as they rotate, and pan means extending around the lower periphery of the pressure members to collect liquid expressed from the alfalfa. The pressure member mounting means includes a pair of upstanding strut assemblies located outboard of the pressure members, bearing means mounted between each strut assembly and each pressure member, hinge means pivotally connecting the bottoms of the strut assemblies to a base to afford downward pivotal movement of the pressure members away from one another, and tie bar means extending across the tops of the pressure members for releasably connecting the strut assemblies together. Screen means and channel means are provided on the confronting surfaces of the pressure members to enhance the pressing action.

These and other objects, features and advantages of the present invention should become apparent from the following description and drawings.

BRIEF DESCRIPTION OF THE DRAWINGS

FIG. 6 is a greatly-enlarged fragmentary sectional view of an orifice through which plant material is extruded in the extrusion apparatus;

Referring now to the drawings, FIGS. 1 and 2 illustrate apparatus 10 which is particularly suited for harvesting and field-processing green plant vegetation including legumes such as alfalfa 11 but which may be used to harvest other green plant forage crops such as timothy, clover, and mixtures of these and other plants commonly called hay. The apparatus 10 comprises a conventional self-propelled vehicle 13 having an engine which is housed in an enclosure 14 and which supplies power through a suitable transmission to drive high-flotation front and rear wheels 16. The wheels 16,16 are steered by an articulated steering system controlled from a driver's compartment 15 located on the front of the vehicle 13. A crop-harvesting header 18 is mounted on the front of the vehicle for cutting the alfalfa 11 as the vehicle 13 advances in the direction indicated by the arrow in FIG. 1.

A typical vehicle having a structure similar to the above is manufactured by Champion Products, Inc., of Eden Prairie, Minn. and is sold under its model designation "4-X-4 Articulated."

Figure 2:
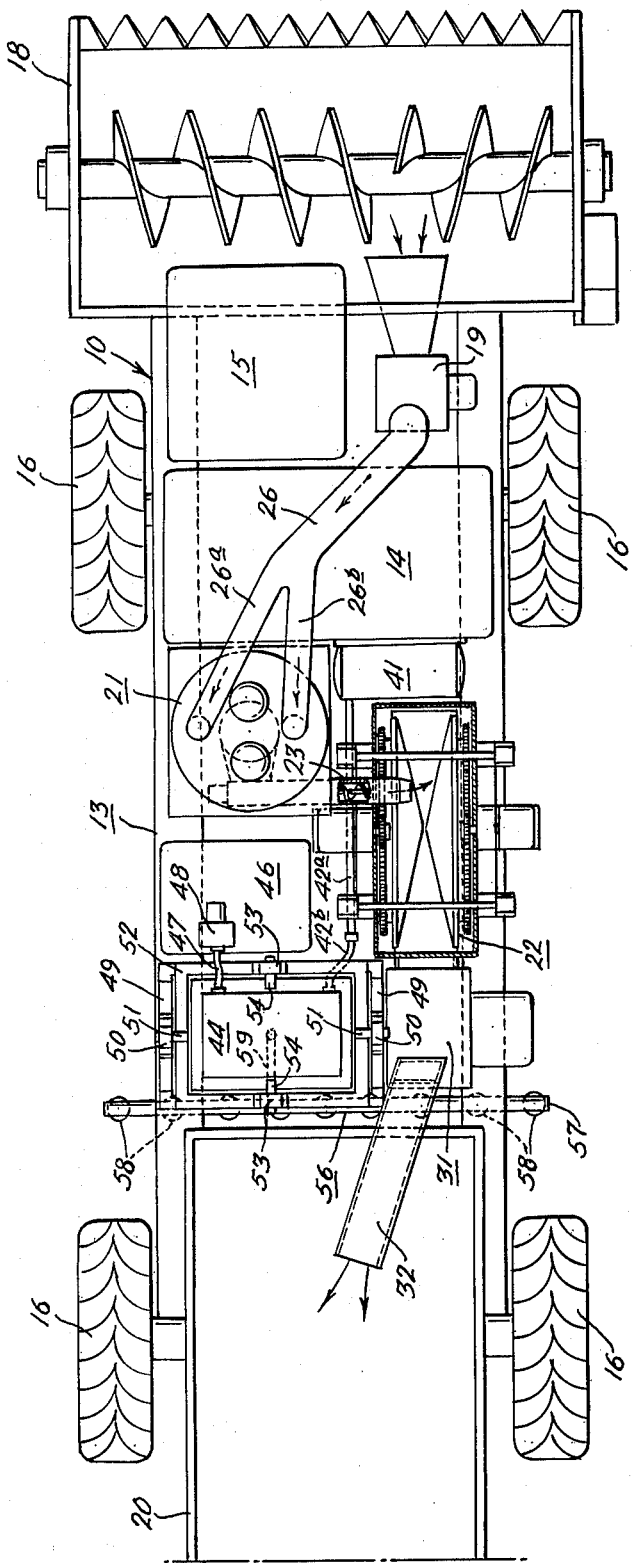
FIG. 2 is a plan view of the apparatus illustrated in FIG. 1.

As best seen in FIG. 2, the header 18 extends transversely across the front of the vehicle 13. The header 18 is designed to cut and convey the alfalfa 11 to a blower-chopper 19 located on the vehicle 13 behind the header 18 and alongside the driver's compartment 15. The blower-chopper 19 functions to convey the alfalfa rearwardly away from the header 18.

In the conventional forage-crop harvester, the alfalfa plants harvested by the header 18 are blown directly into a trailer 20 towed behind the vehicle 13. Thus, when the standing crop of alfalfa 11 has a high moisture content, such as after a rain, the alfalfa collected in the trailer 20 contains a significant amount of water. Heretofore, it was necessary to transport the relatively-heavy, bulky, moisture-laden alfalfa to the dehydrating plant where a substantial amount of thermal energy was required to evaporate the water from the alfalfa.

In accordance with the present invention, the apparatus 10 harvests and field processes alfalfa to minimize the energy required to haul the alfalfa and to dehydrate the same. Specifically, the apparatus 10 is designed to separate from the harvested alfalfa plants a significant amount of the water contained therein and simultaneously to apply the water (which contains chemical compounds valuable as plant fertilizers) directly onto the field.

These advantages are realized by the method of the present invention which comprises the steps of: advancing the mobile harvesting apparatus through a standing crop of alfalfa, harvesting the alfalfa with the apparatus as it advances, separating the harvested alfalfa into a fibrous fraction and a liquid fraction, fractionating the liquid fraction into a first component which has a protein value and a second component which has a fertilizer value, collecting the fibrous fraction and the protein value component of the liquid fraction, and applying the fertilizer value component of the liquid fraction onto the field as the apparatus advances. Thus, the fibrous fraction of the harvested alfalfa is lighter in weight and packs more densely so that it is less expensive to transport; the alfalfa fiber can be dehydrated with less energy; and the liquid fraction by-product is discarded on the field in an economically and environmentally satisfactory manner.

The separating step is performed in a specially-designed rotary extruder or macerator 21 which shreds the harvested alfalfa and a dewatering press 22 which presses the macerated alfalfa to separate the same into a fibrous fraction and a liquid fraction.

Figure 1:
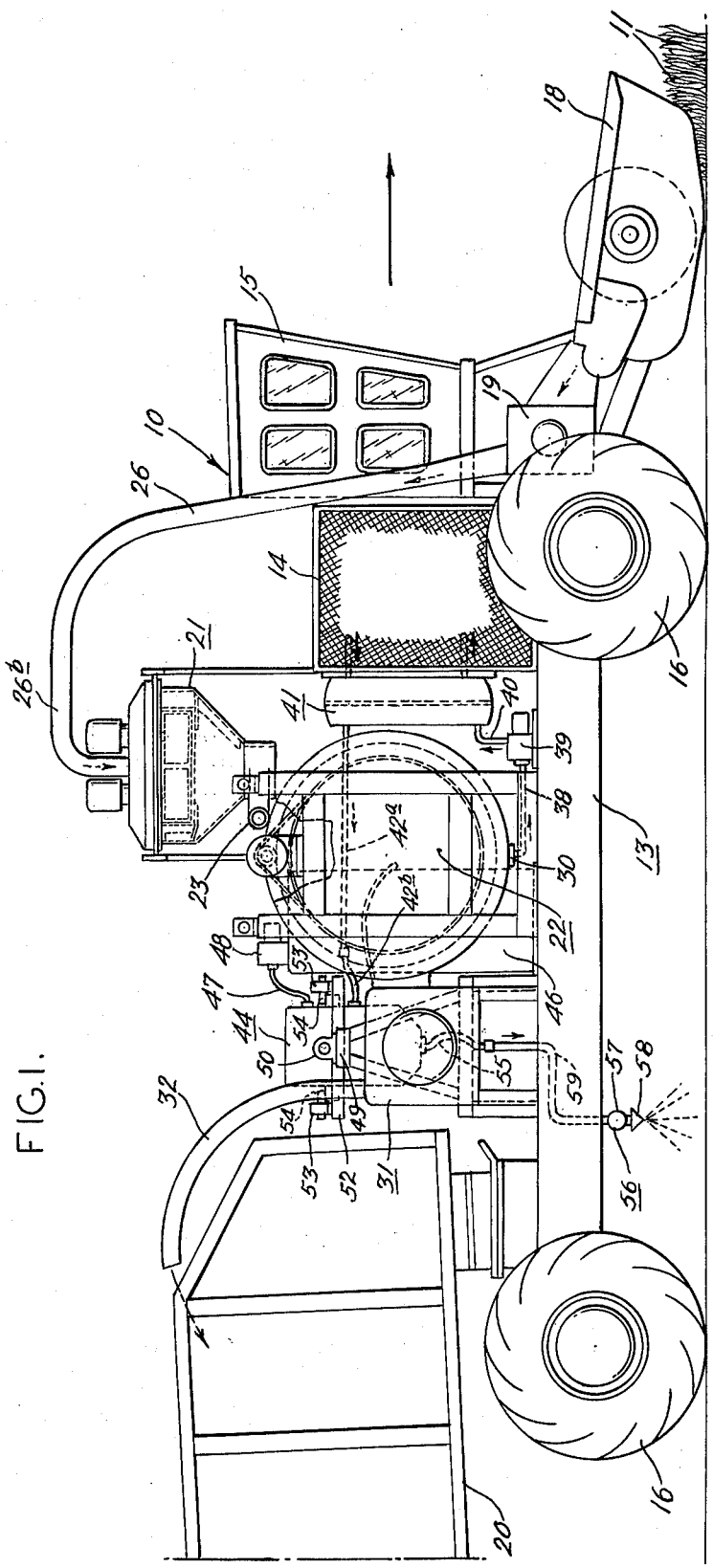
FIG. 1 is a side elevation view of apparatus which is particularly suited for practicing the method of the present invention.

As best seen in FIG. 1, the macerator 21 is carried by the vehicle 13 at an elevated level behind the driver's compartment 15. The havested alfalfa is supplied to the macerator 21 through a tube or conduit 26 which is connected to the blower-chopper 19. As best seen in FIG. 2, the tube 26 has diverging leg portions 26a and 26b which turn downwardly into the top of the macerator 21 to provide means for distributing the alfalfa at diametrical locations in the macerator 21.

The macerated alfalfa emerges from the bottom of the macerator 21 and enters a hydraulically-powered screw conveyor or auger 23 which conveys the macerated alfalfa to the dewatering press 22 located on the side of the vehicle 13 opposite the macerator 21.

The dewatering press 22 has an inlet at its upper end for receiving the macerated alfalfa supplied by the conveyor 23. The alfalfa advances clockwise in the press and is squeezed therein. Liquid expressed from the alfalfa is collected in a drain 30 at the bottom of the press 22. The pressed alfalfa fiber is expelled from the press 22 and into a blower 31 mounted behind the press 22. An upwardly and rearwardly curved chute 32 is connected to the outlet of the blower 31 to direct the pressed fiber rearwardly into the trailer 20 for collection therein.

The structure and operation of both the macerator and the dewatering press will be described more fully hereinafter. It is sufficient to note at this juncture that the macerator functions to rupture the cells of the leaves and stalks of the alfalfa plant by extruding them through shaped orifices. The dewatering press functions to separate the alfalfa plants into liquid and fibrous fractions by applying relatively high pressures to the macerated plants for a sufficient period of time to allow the liquid to flow by gravity from the plants.

The liquid fraction collected at the bottom of the dewatering press 22 is separated into a first liquid component having a protein value and a deproteinized second liquid component having a fertilizer value. To this end, the drain 30 of the press 22 is connected by a conduit 38 to a pump 39 which is connected by a conduit 40 to a heat-exchanger 41. The heat exchanger 41 is connected by a conduit 42a and flexible coupling 42b to a holding or fractionating tank 44 located on the rear of the vehicle 13 behind the macerator 21 and alongside the blower 31. The heat exchanger 41 is connected to means on the vehicle 13 for generating a source of heat, such as the hydraulic fluid which drives the various hydraulic motors and actuators employed on the vehicle. If desired, heat may be obtained directly from the cooling system of the engine. The liquid fraction may also be heated by injecting steam into the liquid fraction. The steam may be generated in the cooling system of the engine and supplied, for example, from the engine radiator, with suitable provision being made to carry make-up water on the vehicle.

The heat exchanger 41 and the fractionating tank 44 should have a sufficient capacity to heat about 4500 gpm of the liquid fraction to a temperature of about 80° C. and to maintain the liquid fraction at that temperature for about 2–4 minutes. The heating which occurs in the heat exchanger 41 and the holding which occurs in the fractionating tank 44 causes the proteins contained in the liquid fraction to coagulate. The coagulated proteins form a bright green curd having the texture of cottage cheese. Because of its low density, the curd rises to the surface of the liquid or whey contained in the fractionating tank, and this permits the curd to be separated from the underlying liquid by conventional skimmers in the tank 44. If desired, a centrifugal separator may be utilized satisfactorily.

After separation from the whey, the curd is fed into a storage container 46 through a flexible coupling 47. Preferably, the storage container 46 is maintained under a slight vacuum by a pump 48 to draw the curd from the fractionating tank 44.

To facilitate separation of the curd from the whey, it is desirable to maintain the liquid fraction relatively quiescent in the fractionating or holding tank 44. To this end, the fractionating tank or vessel 44 is mounted to the vehicle 13 by gimbal means which enables the fractionating tank 44 to pivot about horizontal axes extending both longitudinally and transversely with respect to the path of movement of the vehicle 13. As best seen in FIG. 2, the illustrated gimbal mounting means includes a pair of upstanding A-frame members 49 which mount bearings 50 at their upper ends. The bearings 50 rotatably receive trunnions 51 which extend transversely outward from a rectangular frame 52. The frame 52 mounts a pair of bearings 53 which receive trunnions 54 extending longitudinally outward from the fractionating tank 44. With this structure, the fractionating tank 44 is capable of pivoting about intersecting horizontal axes provided by the trunnions 51 and 54 in response to pitch and roll motion of the vehicle 13. As a result, the liquid contained in the fractionating tank 44 is maintained substantially level as the vehicle 13 advances, thereby facilitating gravitational separation of the curd from the whey.

The residual liquid fraction or whey contained in the fractionating tank 44 includes a chemical compounds which are known to promote plant growth. For example, standing alfalfa containing 80% moisture and 20% protein can yield a whey consisting of 94% water and 6% dry matter, by weight. The dry matter is composed of chemical compounds of the elements nitrogen, phosphorous, potassium, and other growth-promoting trace element compounds. As used herein, the term fertilizer value refers to these chemical compounds.

The deproteinized liquid or whey is applied onto the field as the alfalfa is being harvested and processed. For this purpose, applicator means is provided on the vehicle 13 for spreading the whey on the field. In the illustrated embodiment, the whey is applied by a sprayer assembly 56 which is mounted beneath the vehicle 13. As best seen in FIG. 2, the sprayer assembly 56 comprises an elongated manifold 57 and a series of spray heads 58 depending from the manifold 57 in spaced relation therealong. The manifold 57 is connected to the bottom of the fractionating tank 44 by a conduit 59 and a flexible coupling 55. Although the whey will flow by gravity from the fractionating tank 44 to the spray heads 58, it may be desirable to install a pump in the conduit 59 between the tank 44 and the manifold 57 to increase the spraying pressure at the spray heads 58. In the present gravity flow system, the manifold 56 has a length which is substantially coextensive with the width of the harvesting header 18 so that the whey is spread substantially uniformly across the width of the swath cut by the harvesting head 18.

The alfalfa plants are shredded thoroughly and efficiently by causing them to be forced through a series of relatively small openings in the rotary extrusion apparatus or macerator 21 which functions to rupture the cells of the alfalfa plants. To this end, the macerator 21 includes a rotary die ring 60 having a cylindrical peripheral wall 61 and a bottom wall 63 extending transversely across the lower end of the peripheral wall 61. The peripheral wall 61 has a series of extrusion orifices 62 which extend radially outward through the wall 61. The die ring 60 is open at its upper end to afford downward infeeding of the alfalfa plants into its interior.

Figure 4:
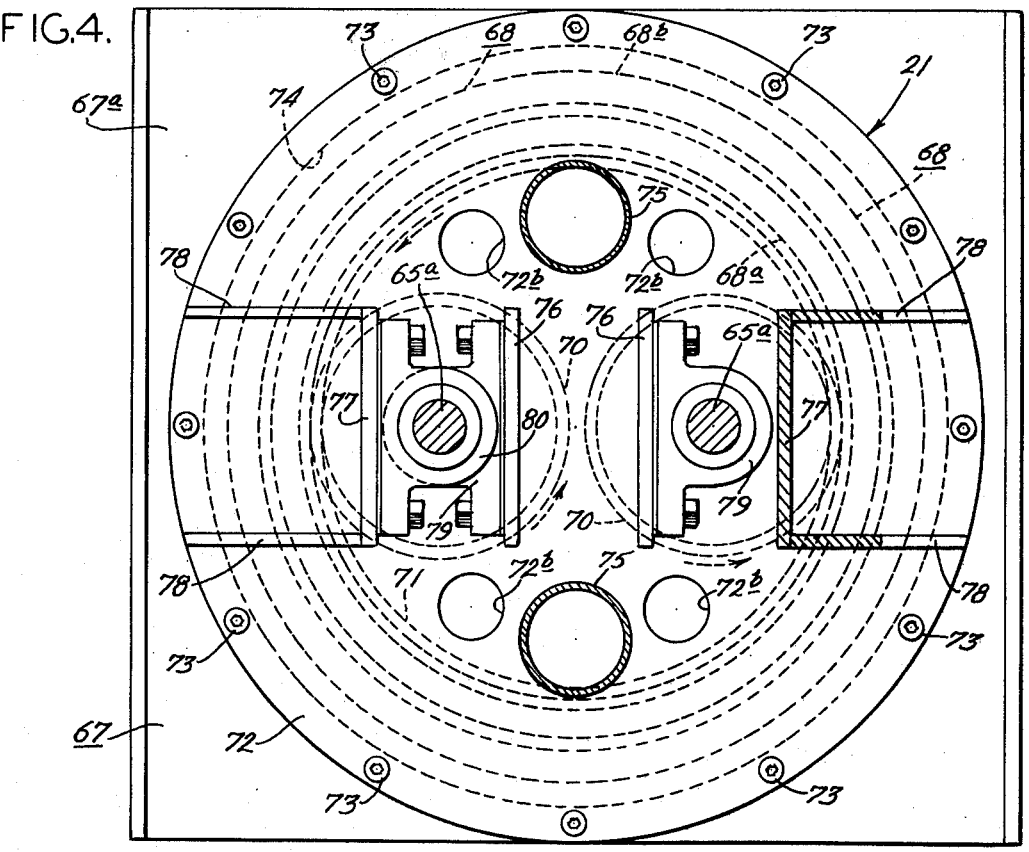
FIGS. 4 and 5 are enlarged sectional views taken on lines 4—4 and 5—5, respectively, of FIG. 3.
Figure 5:
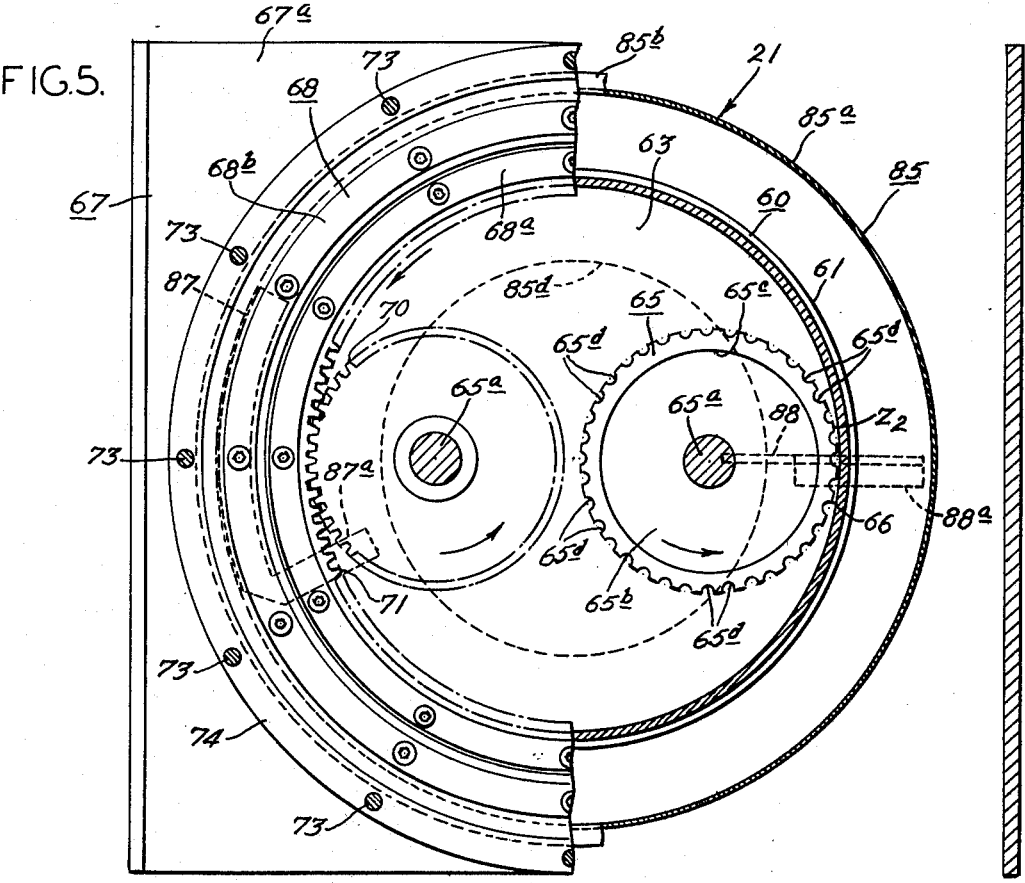

The alfalfa plants are forced through the orifices 62 by pressure-applying means provided at diametrical locations in the die ring 60. In the present instance, the pressure is applied by roller means which comprises a pair of hollow rollers 65 mounted at diametrical locations in the die ring 60 for rotation about axes $A_2$ and $A_3$ extending parallel to the central axis $A_1$ of the die ring 60. Preferably, each roller 65 has a central shaft 65a which projects upwardly beyond the upper end of the die ring 60. The shaft 65a mounts a pair of axially-spaced circular plates 65b, and a cylindrical wall 65c surrounds the circular plates 65b. As best seen in FIG. 5, a plurality of axially-extending grooves or serations 65d are spaced apart around the periphery of each roller wall 65c to provide an effective means for gripping the plants. Each roller 65 is substantially as high as the peripheral wall 61 of the die ring 60, and the outside diameter of each roller 65 is slightly less than the radius of the die ring 60 measured from its axis $A_1$ to the inside of the die ring wall 61. This dimensional relation provides a gently tapered nip 66 between the periphery of each roller 65 and the inside of the die ring wall 61. The tapered nip cooperates with the roller gripping means to facilitate the gripping of alfalfa plants by the rollers 65 and the feeding of the plants between the rollers 65 and the die ring 60 as they rotate in the directions indicated by the arrows in FIG. 4. This enables each roller 65 to cooperate with the die ring wall 61 to apply pressure in a radial direction to alfalfa plants interposed therebetween for extruding the alfalfa plants outwardly through the orifices 62.

Figure 3:
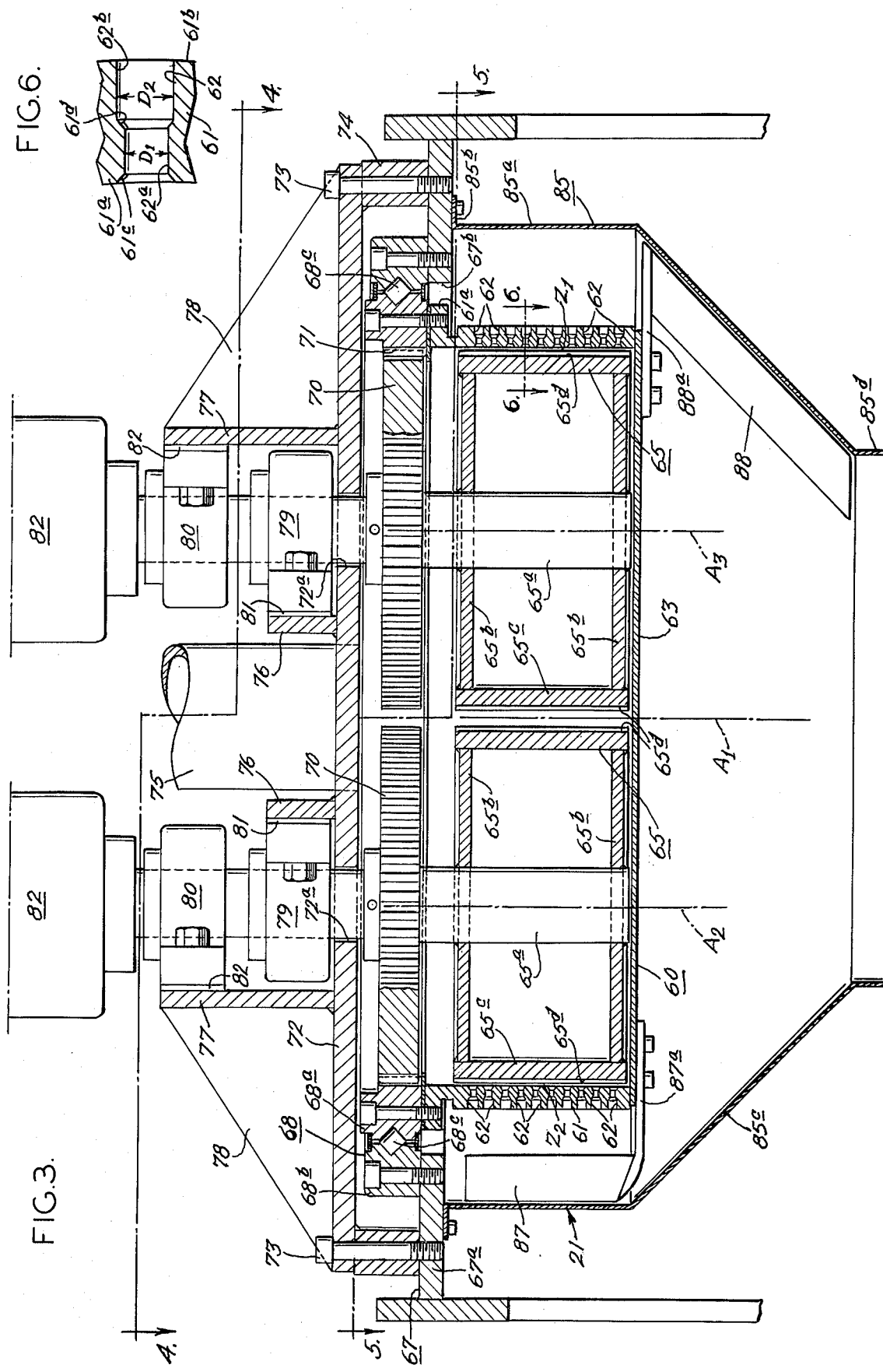
FIG. 3 is an enlarged sectional view of rotary extrusion apparatus for macerating plants.

The die ring 60 and the rollers 65 are rotatably supported by means of a frame 67. In the illustrated embodiment, the frame means 67 includes a plate 67a and thrust bearing means 68 rotatably mounting the die ring 60 to the frame plate 67a. As best seen in FIG. 3, the frame plate 67a has a circular central aperture 67b which surrounds an outwardly-extending peripheral flange 61a on the die ring wall 61. The bearing 68 has an inner ring 68a bolted onto the top of the die ring flange 61a, and the bearing 68 has an outer ring 68b bolted onto the top of the frame plate 67a. The bearing 68 has a plurality of rolling elements 68c interposed at an angle between the inner and outer rings 68a and 68b to enable the bearing to accept both radial and thrust loads. Thus, the die ring 60 is rotatably supported around its upper periphery in the frame 67.

The rotation of the die ring 60 is synchronized with the rotation of the rollers 65. To this end, gearing means is provided to couple the die ring 60 and the rollers 65 so that they have substantially equal peripheral velocities at the diametrical die ring extrusion zones $Z_1$ and $Z_2$. As seen in FIG. 5, the gearing means includes a spur gear 70 mounted on the roller shaft 65a above the upper end of the roller 65, and a ring gear 71 intergral with the inner ring 68a of the bearing 68. The ring gear 71 has internal teeth which mesh with the external teeth on each spur gear 70. The pitch diameter of each spur gear 70 corresponds substantially to the outside diameter of each roller 65, and the pitch diameter of the die ring gear 71 corresponds substantially to the inside diameter of the die ring 60. Thus, ahead of the nip 66 between the roller 65 and the die ring 60, the peripheral speed of the roller 65 is greater than the peripheral speed of the die ring wall 61, while at the zone of maximum outward extrusion (between the die ring wall 61 and the roller 65) the peripheral speed of the die ring wall 61 and each roller 65 is substantially equal. This relation promotes infeeding of the plant matter into the extrusion zones $Z_1$ and $Z_2$ (FIG. 4) and extrusion of the vegetation.

The plant matter to be macerated is distributed uniformly in the die ring 60. For this purpose, distributor means is provided to feed the plant matter into the die ring 60 at diametrical locations ahead of the rollers 65. In the illustrated embodiment, the distributor means includes a circular cover plate 72 which overlies the upper end of the die ring 60 and which is spaced from the die ring 60 by a peripheral spacer ring 74. The cover plate 72 and the spacer ring 74 are removably secured to the frame 67 by a series of circumferentially-spaced bolts 73 which depend through the spacer ring 74 and into the frame plate 67a. A pair of inlet tubes or ferrules 75 are provided at diametrical locations in the cover plate 72 and are offset 90° with respect to the rollers 65. The inlet ferrules 75 are adapted to be connected to the downturned ends of the legs 26a and 26b of the feed conduit 26 (See FIG. 2). Preferably, the coverplate 72 is provided with several openings 72b to afford the escape of air entrained in the alfalfa from the interior of the die ring. Thus, plant matter to be extruded in the die ring 60 is fed downwardly through the ferrules 75 and is distributed substantially evenly in the die ring 60 at locations ahead of the rollers 65 where the plant matter can be readily gripped by the rollers 65.

A substantial amount of pressure is applied to the plant matter to extrude it through the orifices 62 in the die ring wall 61. In order to enable the rollers 65 to apply the pressure continuously, bearing means is provided above the cover plate 72 to mount the rollers 65 for rotation in the die ring 60. As best seen in FIG. 3, the roller shafts 65a, 65a project upwardly through a pair of holes 72a in the cover plate 72, and the bearing means is mounted in a recess provided by mounting means which protrudes upwardly from the topside of the cover plate 72 adjacent each aperture 72a. In the present instance, the mounting means includes a short upwardly-protruding mounting plate 76 welded to the topside of the cover plate 72 adjacent each aperture 72a and a long upwardly-protruding mounting plate 77 welded to the topside of the cover plate 72 on the side of the aperture 72a opposite the short mounting plate 76. The long mounting plate 77 is reinforced by a pair of gusset plates 78 which extend outwardly toward the edge of the cover plate 72. The upper end of the roller shaft 65a projects upwardly intermediate the mounting plates 76 and 77 and is received in axially-spaced pillow blocks 79 and 80 which are bolted to the mounting plates 76 and 77, respectively. Preferably, shims 81 and 82 are interposed between the bases of the pillow blocks 79 and 80 and the mounting plates 76 and 77 in order to provide means for adjusting the spacing between the outer periphery of the rollers 65 and the inner periphery of the die ring wall 61.

In order to provide the power to drive the die ring 60 and the rollers 65, means is provided to rotate each roller 65. In the illustrated embodiment, the rotating means includes a conventional hydraulic motor 82 connected to the upper ends of each roller shaft 65a. The hydraulic motors 82 are connected to the frame 67 by suitable brackets (not shown). Preferably, each hydraulic motor 82 is of about 25 horsepower and rotates at a constant speed of 200 rpms. Thus, with the gearing means coupling the rollers 65 to the die ring 60, the die ring 60 rotates about its axis $A_1$ at a speed of about 100 rpms. This speed has the effect of causing the alfalfa fed into the die ring 60 to be forced outwardly against the die ring wall by centrifugal force. The macerator 21 has a capacity of macerating 60,000 lbs./hr. of freshly-harvested alfalfa.

The macerated plant matter expelled from the die ring 60 is collected by means of a shroud 85 which depends from the frame plate 67a and surrounds the die ring 60. As best seen in FIG. 3, the shroud 85 has a cylindrical upper wall 85a which surrounds the peripheral wall 61 of the die ring 60 and an outturned flange 85b which is bolted to the underside of the frame plate 67a. The shroud 85 has a funnel-shaped lower wall 85c which depends from the cylindrical wall 85a and terminates in a central outlet 85d coaxial with the rotational axis $A_1$ of the die ring 60. Thus, plant matter discharged from the die ring 60 is collected in the shroud 85 and is discharged from the common outlet 85d.

The shredded plant matter is displaced positively in a downward direction in the shroud 85 as the macerator 21 operates. To this end, impeller means is provided in the shroud 85 and is rotatable in response to rotation of the die ring 60. In the present instance, the impeller means includes a pair of blades 87 and 88 which sweep across the inner surface of the shroud 85 as the die ring rotates. As best seen in FIGS. 3 and 5, the blades 87 and 88 have radially extending mounting arms 87a and 88a, respectively, both of which volt onto the underside of the transverse wall 63 of the die ring 60. The upper blade 87 inclines upwardly and rearwardly (relative to the direction of motion of the die ring 60) between the inside of the upper shroud wall 85a and the outside of the die ring wall 61. The lower blade 88 depends along the inside of the lower shroud wall 85c. Both blades 87 and 88 have outer edges located in close proximity with the inside of the shroud 85. With this structure, rotation of the die ring 60 about its axis $A_1$ causes both blades 87 and 88 to sweep along the inner surface of the shroud 85 and thereby to displace shredded plant matter in a generally downward direction through the shroud 85 and toward its outlet 85c.

The macerator 21 is specially designed to rupture the cells of legumes such as alfalfa. To this end, each of the die ring extrusion orifices 62 has a predetermined shape which provides a controlled compression and expansion of the plant matter within the wall 61 of the die ring 60 as the plant matter is forced therethrough. As best seen in FIG. 6, each orifice 62 has a generally cylindrical cross-section with different diameters at axially-spaced locations in the die ring wall 61. For example, each orifice 62 has a surface 62a with a minor inner diameter $D_1$ adjacent the inner surface 61a of the die ring wall 61, and each orifice 62 has a surface 62b with major outer diameter $D_2$ adjacent the outer surface 61b of the die ring wall 61. The major diameter $D_2$ is greater than the minor diameter $D_1$ in a ratio of about 1.3:1.0. Preferably, a chamfered surface 61c connects the inner die ring surface 61a and the surface 62a of the orifice 62, and a chamfered surface 61d connects the surfaces 62a and 62b of the orifice 62. Preferably, the total length of the surface 62b is substantially equal to one-half the thickness of the die ring wall 61. By way of example, the die ring wall 61 has a thickness of about 1 inch, and the orifice 62 has a minor diameter $D_1$ of about 7/16 inch. Preferably, the orifices 62 are drilled on vertical centers of about 11/16 inch and on circumferential centers of about ¾ inch around the periphery of the die ring wall 61. Although the particular shape, spacing, etc. of the orifice will vary, depending on the type of material to be macerated, the shape of the orifice 62 disclosed herein is particularly suited for macerating alfalfa plants.

Figure 7:
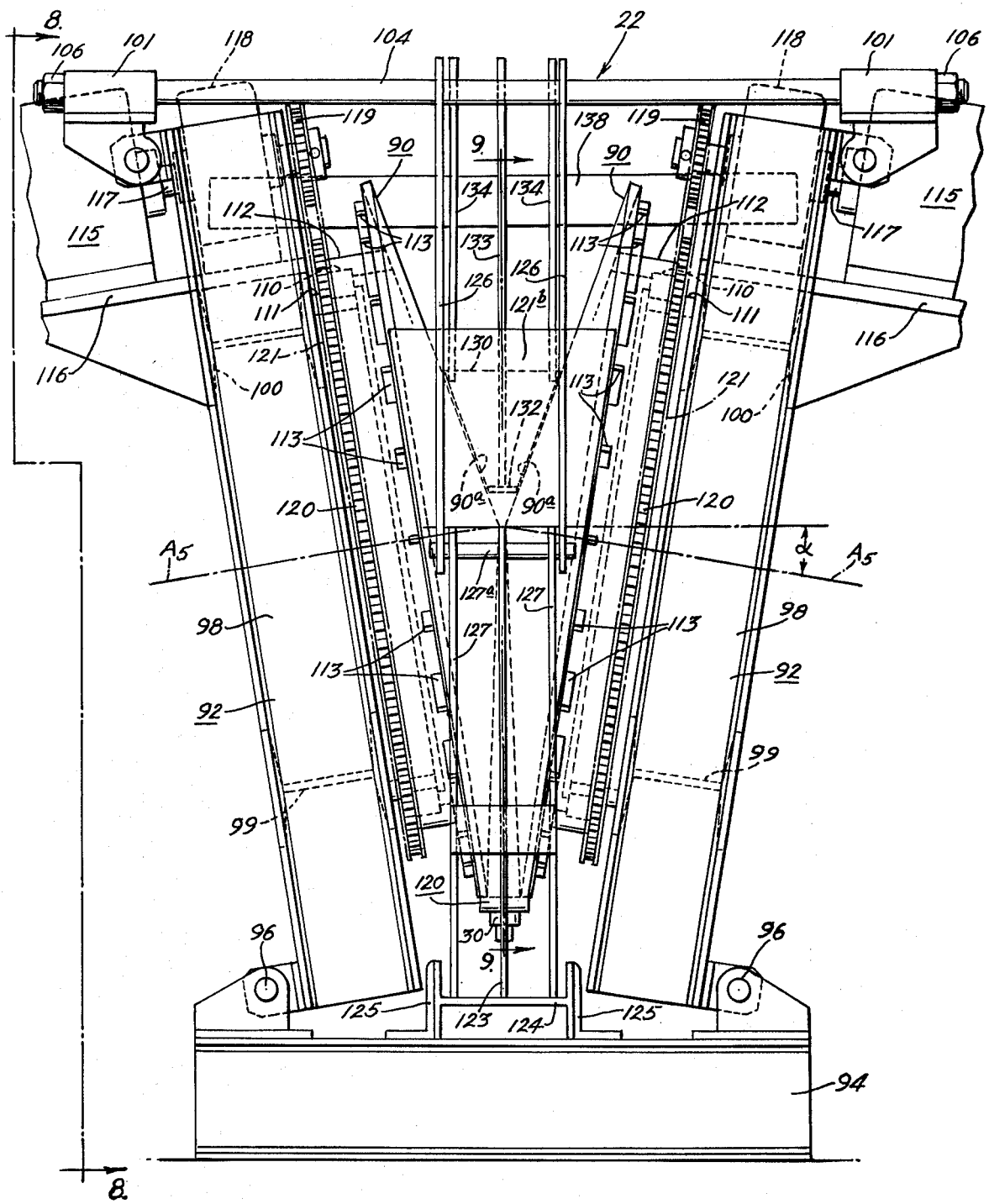
FIG. 7 is an enlarged front elevational view of a dewatering press particularly suited for use in separating macerated plant material into liquid and fibrous fractions.

The macerated plant matter is separated into liquid and fibrous fractions in the dewatering press 22 which causes a continuous pressure to be applied to the macerated plant matter for a sufficient period of time to enable the liquid fraction to flow by gravity from the fibrous fraction. To this end, the dewatering press 22 comprises a pair of conically-shaped pressure members or plates 90 and frame means 92 mounting the pressure plates 90 for rotation about their central axes $A_5, A_5$. As best seen in FIG. 7, the pressure plates 90 are disposed with their apexes 90a in closely-spaced confronting relation and their axes $A_5$ intersecting one another at an obtuse downwardly-subtended included angle of about 150°, forming angles $\alpha$ of about 15° with respect to the horizontal. This causes the confronting working surfaces of the pressure members 90 to diverge above the apexes 90a for receiving plant matter and to converge below the apexes 90a for pressing the plant matter. For instance, the surfaces have a maximum divergence at the twelve o'clock position and a maximum convergence at the 6 o'clock position. When the pressure plates 90 are rotated clockwise (FIG. 8) about their axes, increasing pressure is applied to the plant matter as it advances from the 12 o'clock to the 6 o'clock position. By way of example, the pressure member 90 has an outside diameter of about 5 ft. and an axial height of about ½ ft. and provides a volumetric compression ratio of about 4:1.

Figure 8:
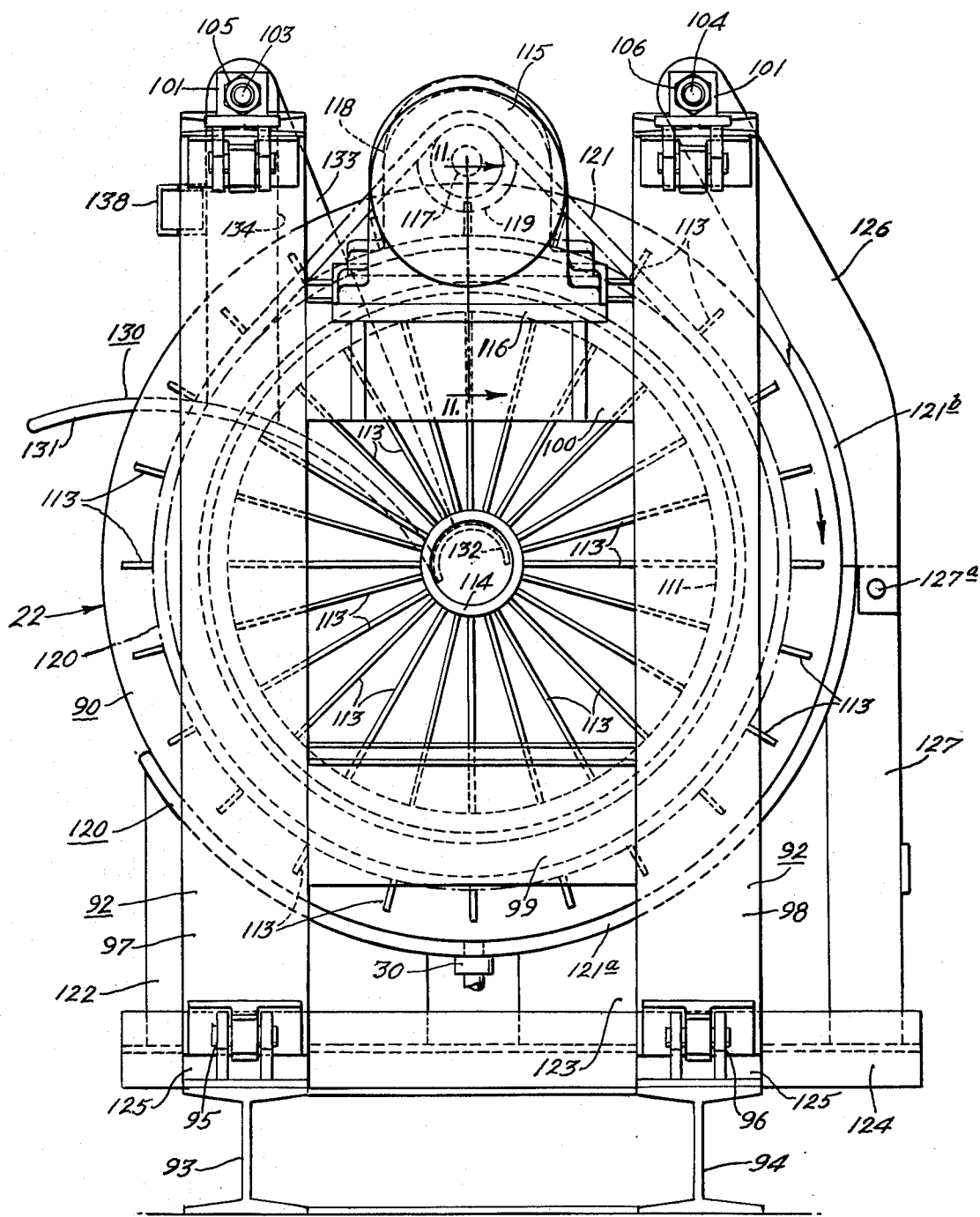
FIG. 8 is a side elevational view of the dewatering press taken on line 8—8 of FIG. 7.

The pressure plates 90 can be separated readily for cleaning and maintenance purposes. To this end, the frame means mounts the pressure members 90 in a manner affording pivotal separation thereof. As best seen in FIG. 8, the frame means 92 comprises a pair of base beams 93 and 94 which extend is spaced parallel relation beneath the pressure members 90. The base beams 93 and 94 mount hinge assemblies 95 and 96, respectively, on their upper flanges, and the hinge assemblies 95 and 96 mount a pair of upstanding struts or beams 97 and 98. The struts 97 and 98 are connected together by lower and upper braces 99 and 100, respectively. The upper ends of the beams 97 and 98 pivotally mount journal blocks 101 and 102 which receive tie rods 103 and 104, respectively, which extend across the top of the pressure members 90. Opposite ends of each rod 103 and 104 are threaded and receive nuts 105 and 106 which engage the outsides of the journal blocks 101 and 102. The tie rods 103 and 104 function to resist the forces applied axially in opposite directions against the pressure members 90 as they squeeze the plant matter. The tie rods 103 and 104 releasably connect the pressure members 90 in their operating relation to enable them to be pivoted downwardly about their hinges 95 and 96 to afford access to the inside of the dewatering press 22 for cleaning and maintenance. Also, the tie rods 103 and 104 afford a slight adjustment of the spacing between the confronting surfaces of the pressure members 90 to enable the capacity of the press to be increased for those applications where less than maximum pressing pressures are needed.

Figure 11:
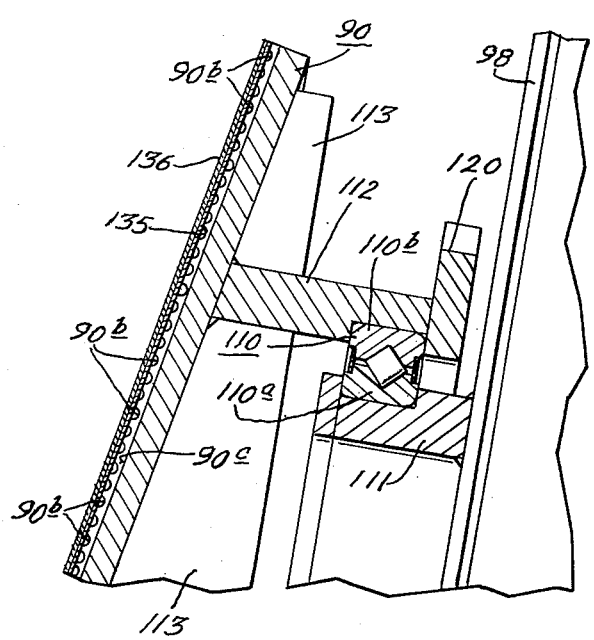
FIG. 11 is a greatly-enlarged sectional view taken on line 11—11 of FIG. 8.

As the plant matter is squeezed between the pressure members 90 substantial reaction forces are applied to the pressure members 90 as they rotate about their axes. In order to counteract the reaction forces, a thrust bearing 110 is provided between each pressure member 90 and its supporting strut assembly 97–100, and means is provided to mount the thrust bearing 110 therebetween. As best seen in FIG. 11, the thrust bearing mounting means includes an annular ring 111 which extends inwardly from the strut assembly 97–100 and which has an outer annular groove mounting the inner ring 110a of the thrust bearing 110. A larger diameter annular flange 112 extends outwardly from the rear of the pressure member 90 and has an inwardly-facing peripheral groove which receives the outer ring 110b of the thrust bearing 110. Each pressure member 90 is reinforced by a plurality of radially extending reinforcing ribs 113 which extend outwardly from a central hub 114 on the outside of the pressure member 90 and beyond the annular flange 112 to terminate adjacent the outer periphery of the pressure member 90. With this structure, each pressure member 90 is relatively lightweight yet rigid and is capable of rotating with a minimum of friction even when substantial pressures are applied.

For the purpose of rotating the pressure members 90 each pressure member 90 is provided with independent drive means. In the present instance, as best seen in FIG. 7 and 8, the rotating means for each pressure member 90 includes an hydraulic motor 115 mounted on a ledge 116 which extends outwardly from the upper brace 100 of the strut assembly. The motor 115 has a shaft 117 which extends through a pillow block 118 mounted on the ledge 116, and a small sprocket or rotor 119 is mounted on the end of the motor shaft 117. As best seen in FIG. 11, a large sprocket or drive member 120 is welded to the outside edge of the pressure member flange 112. A drive chain 121 engages the sprockets 119 and 120 so that rotation of the hydraulic motor 115 causes the pressure member 90 to rotate about its axis $A_5$. Preferably, the motor 115 is of 15 hp and rotates at 30 rpm to rotate the pressure member 90 at a speed of about 1.0 rpm, thereby providing a pressing capacity of 60,000 lbs/hr of macerated plant matter. Since the pressure members 90 rotate at relatively slow speeds, it is not necessary for their rotational speeds to be synchronized in order to obtain a satisfactory pressing action. It is believed that the lack of synchronization actually causes the plant matter to be stirred slightly to improve the pressing action.

Figure 9:
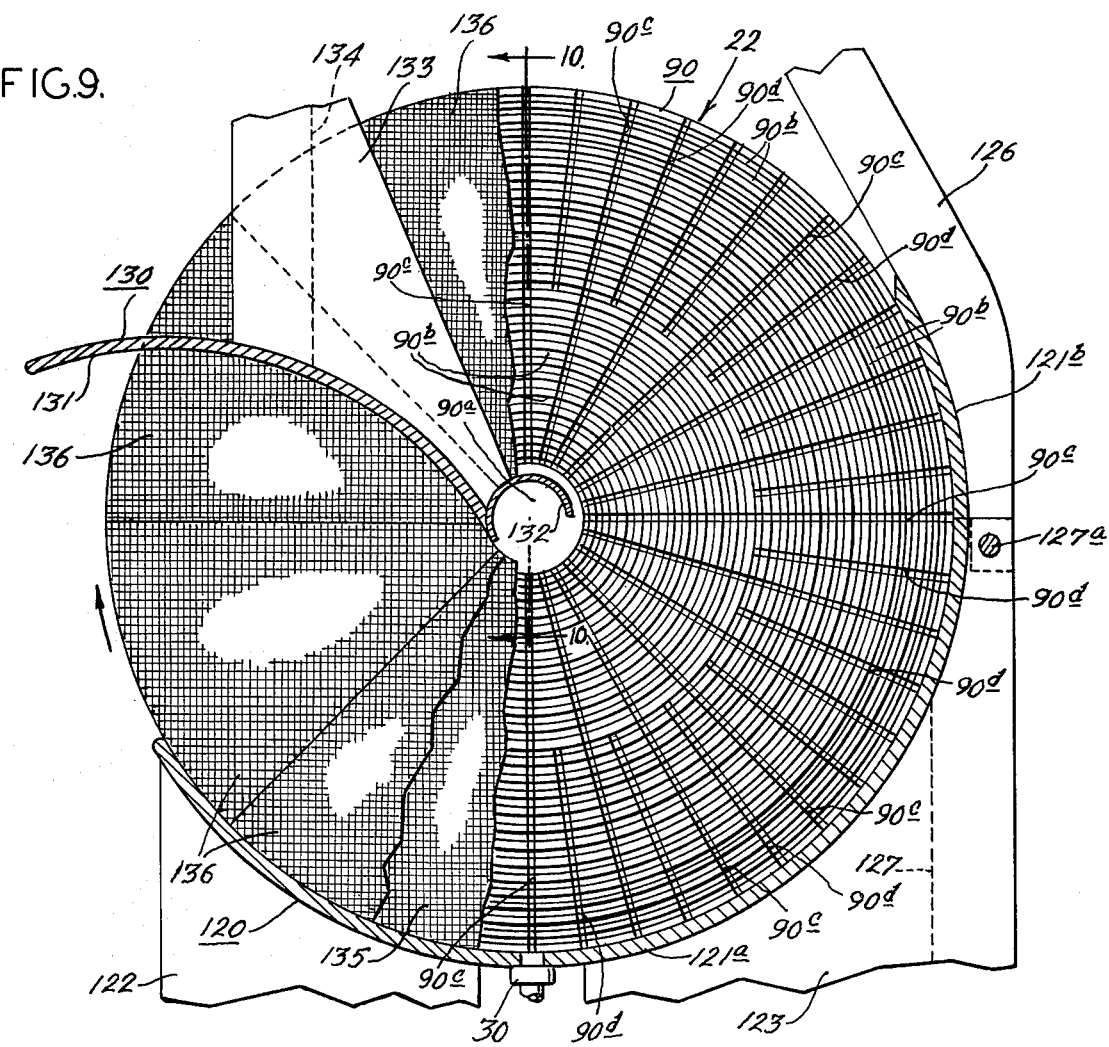
FIG. 9 is a sectional view of the dewatering press taken on line 9—9 of FIG. 7.

The liquid fraction expressed from the fibrous fraction when the pressure members 90 are rotated in the clockwise direction (FIG. 8) flows by gravity toward the drain 30 in the bottom of the dewatering press 22. In order to collect the liquid fraction and to channel the same to the drain 30, pan means 120 is provided. As best seen in FIG. 9, the pan means includes a hardened steel pan plate having a lower portion 121a which extends along the lower periphery of the pressure member 90 from about the 8 o'clock position to about the 3 o'clock position across the lower edges of the pressure member 90 in close proximity therewith to resist leakage therebetween. The lower portion of the pan plate 121a is supported by a pair of aligned upstanding gusset plates 122 and 123 which are welded onto an I beam 124 mounted between angles 125 secured transversely across the tops of the base beams 93 and 94. The pan plate also has an upper portion 121b which extends similarly from the 3 o'clock position to about the 2 o'clock position. The upper portion 121b of the pan plate is mounted to a pair of arms 126 which are pivotally mounted at their upper ends to the tie bar 104 and which depend therefrom in spaced parallel relation. The lower ends of the arms 126 receive the upper ends of stanchions 127 which project upwardly from the I beam 124. A pin 127a extends through the arms 126 and 127 and releasably connects them together to maintain the upper portion of the pan plate 121b in operative relation against the outer periphery of the pressure members 90.

Figure 10:
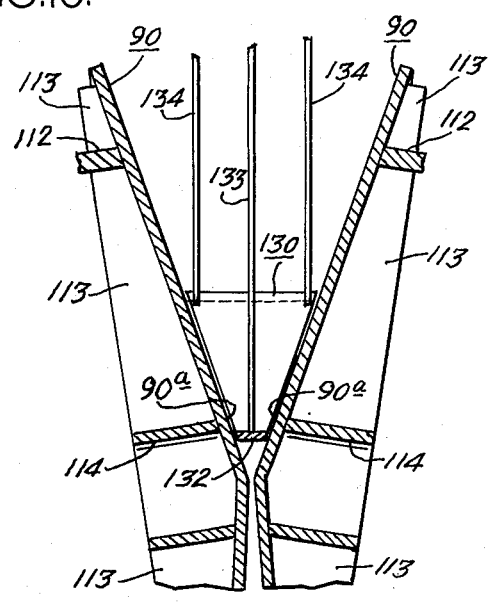
FIG. 10 is a fragmentary sectional view taken on line 10—10 of FIG. 9.

The fibrous fraction is expelled continuously from between the pressure members 90 as they rotate. To this end, deflector means 130 is provided between the confronting surfaces of the pressure members 90 at the rear of the dewatering press 22. As best seen in FIG. 9, the deflector means 130 comprises a concave vane plate 131 which extends outwardly and upwardly from an arcuately-shaped wall 132 located closely adjacent the apexes 90a of the pressure members 90. A triangularly-shaped gusset plate 133 projects upwardly from the upper surface of the vane plate 131 and wall 132 and is pivotally mounted on the rear tie rod 103. As best seen in FIG. 10, the deflector vane 131 and wall 132 are sized to span across the gap between the confronting surfaces of the pressure members 90. A pair of arms 134 extend vertically upward from the upper surface of the vane plate 131 and are pivotally mounted to the tie rod 103 to resist forces applied vertically by the fibrous fraction as the pressure members 90 rotate and the fibrous fraction is deflected outwardly from the rear of the dewatering press 22. The gusset plate 133 cooperates with the upper surface of the deflector vane 131 and wall 132 to channel the incoming plant matter toward the right of the rotational axes of the pressure members 90 when it is charged downwardly into the top of the dewatering press 22. A hollow elongated member 135 mounts transversely across the arms 134 and the gusset plate 138 and engages across the rear beams 97 to prevent the deflector plate 131 from pivoting about the tie rod 103.

The pressure members 90 are designed to enable the liquid fraction to flow freely by gravity into the pan means 120. For this purpose, channel and screen means is provided on each pressure member 90 to cause the liquid fraction to flow in the desired direction. As best seen in FIG. 9, the channel means includes a series of concentric circular grooves 90b spaced apart on the inner or working surface of the pressure member 90. The circular grooves 90b are intersected at spaced intervals by deeper channels 90c each of which extends radially outward from a location adjacent the apex 90a of the pressure member 90. Shorter similar channels 90d extend radially outward intermediate adjacent longer channels 90c. All of the channels 90c and 90d extend to the outer periphery of the pressure member 90. Thus, liquid can flow in the circular grooves 90b to the channels 90c or 90d whereupon it flows radially downward by gravity into the drain 30 in the pan means 120. As a result, the imperforate pressure members eliminate the need for additional means to collect the expressed liquid.

To prevent the grooves and channels in each pressure member 90 from becoming clogged with vegetation during operation of the dewatering press 22, screen means is provided to cover the working surface of each pressure member 90. As best seen in FIG. 9, the screen means includes a series of segments 135 of a lower or inner screen or perforated support plate removably mounted against the working surface of each pressure member 90 by suitable fasteners (not shown). Another series of screen segments 136 are superimposed over the lower screen segments 135 and are removably fastened in a similar manner to each pressure member 90. Preferably, the support screen 135 adjacent the pressure member 90 is thicker than the outer screen 136 to prevent its being forced into the grooves and channels. The outer screen 136 functions to prevent small particles of the vegetation from being forced into the holes in the support screen 135 and then the grooves 90b and the channels 90c and 90d and interfering with the free flow of fluid therein. Of course, the screens 135 and 136 are capable of being removed readily for periodic cleaning. The particular size of the mesh of the screens will depend on the type of material being pressed. The outer screen 136, however, must be sufficiently fine as to keep the plant fiber on its surface.

In operation, the motors 115 cause the pressure members 90 to rotate in the direction indicated by the arrow in FIG. 8. The plant matter to be pressed is fed downwardly into the space between the pressure member 90 to the right of their apexes, and the plant matter is gradually pressed between the 12 and 6 o'clock position as the pressure member 90 rotate. The liquid expressed from the plant matter flows in the grooves and channels in the pressure members and into the pan means 120 before entering the pan drain 30. The pressed plant fiber continues to advance in the clockwise direction toward the 9 o'clock position until is contacts the deflector vane 131 and is expelled outwardly from between the pressure members 90.

The dewatering press 22 is designed to separate approximately 60,000 lbs/hr. of alfalfa into fibrous and liquid fractions. Inlet and outlet conduits are provided to feed and remove the plant matter; however, they have been omitted from the drawings to simplify the illustrations.

The apparatus of the present invention enables substantial fuel savings to be realized in the dehydration of alfalfa. For instance, it is estimated that up to 50% of the fuel presently needed to dehydrate a given quantity of alfalfa can be saved. Also, since more alfalfa fiber can be carried in a vehicle of a given volumetric capacity, fewer trips from field to plant are necessary. This results in an additional saving of fuel and labor.

In view of the foregoing, it should be apparent that the present invention provides an improved method and apparatus for processing vegetation in an efficient manner. Although the macerator and dewatering press are specially designed to be carried on a vehicle, it should be apparent that they may be used satisfactorily at stationary processing plants.

While a preferred method has been disclosed, and preferred embodiments of the apparatus have been disclosed in detail, various modifications, alterations and changes may be made without departing from the spirit and scope of the present invention as defined in the appended claims.

I claim:

1. A method for processing plant vegetation in a field to obtain therefrom a fibrous fraction and a liquid fraction, said method comprising the steps of:

harvesting the vegetation with mobile harvesting apparatus as it advances through the field, separating the harvested vegetation on said mobile apparatus during harvesting to obtain from the plants a fibrous fraction and a liquid fraction, fractionating said liquid fraction into a first component and a second component, collecting said fibrous fraction and said first liquid component, and applying said second liquid component onto said field as said apparatus advances, whereby the second liquid component is discarded during harvesting and processing of the vegetation.

2. The method according to claim 1 wherein said first component includes protein and said second component is substantially free of plant protein, and said fractionating step includes the step of heating said liquid fraction to a temperature within a predetermined range, admitting said heated liquid fraction to a holding tank, and holding said heated liquid fraction in said holding tank for a period of time sufficient to coagulate said protein, and removing said coagulated protein and said substantially protein free component from said holding tank.

3. The method according to claim 2 wherein said heating step includes the step of generating heat on said mobile apparatus, and passing said liquid fraction in heat transfer relation with said generated heat to cause said liquid fraction to be heated to said temperature.

4. The method according to claim 3 wherein said fractionating step includes the step of maintaining said holding tank substantially level as the vehicle advances to enable said coagulated protein to float on said deproteinized liquid in said holding tank.

5. The method according to claim 4 wherein said plant vegetation is alfalfa, and said temperature of said liquid fraction in said heating and holding step is at least about 80° C.

6. The method according to claim 1 wherein said separating step includes the steps of macerating the harvested vegetation and pressing the macerated vegetation to obtain said fibrous and liquid fractions.

7. The method according to claim 6 wherein said macerating step includes the steps of admitting said vegetation into a rotatable die ring having a peripheral wall with orifices therein, rotating said die ring about its axis, and applying pressure against said vegetation in a radial direction as said die ring rotates to extrude the plants outwardly through the orifices.

8. The method according to claim 7 wherein said pressure in said pressure applying step is directed in diametrically-opposite directions at predetermined peripheral zones in said die ring, and said vegetation is admitted into said die ring at locations intermediate said zones.

9. The method according to claim 8 including the step of gathering the extruded vegetation around the periphery of said die ring, and displacing the extruded vegetation away from the periphery of the die ring as it rotates.

10. The method according to claim 6 wherein said pressing step includes the steps of feeding the plant vegetation between a pair of juxtaposed conical pressure members rotatable about axes intersecting one another at an obtuse angle, rotating the pressure members about their axes to squeeze the plant vegetation, collecting the liquid fraction at the bottom of the pressure members, and expelling the fibrous fraction from between the pressure members as they rotate about their axes.

11. Apparatus for field processing vegetation, comprising:
a vehicle adapted to travel through a field of vegetation,
means carried by said vehicle for harvesting the vegetation as the vehicle advances,
means carried by said vehicle for cooperating with said harvesting means to separate the harvested vegetation into a fibrous fraction and a liquid containing a plant protein composition and other compositions,
means carried by said vehicle for cooperating with said separating means to fractionate said liquid fraction into a first component containing said plant protein composition and a second substantially protein free component containing said other compositions,
means movable with said vehicle for collecting said fibrous fraction and said plant protein composition, and
means carried by said vehicle for applying said other compositions onto the field as the vehicle advances,
whereby the second liquid component is discarded during harvesting and processing of the vegetation.

12. Apparatus according to claim 11 wheren said fractionating means includes means on said vehicle for generating a source of heat, means for flowing said liquid fraction in heat transfer relation with said heat source, holding tank means for receiving said heated liquid fraction and thereby to afford coagulation of said protein, and means connected to said holding tank to remove coagulated protein and the substantially protein free liquid from said holding tank.

13. Apparatus according to claim 12 wherein said holding tank means includes a support structure, a vessel carried by said support structure, and gimbal means mounting said vessel in said support structure to afford pivotal movement of said vessel about axes disposed transversely and longitudinally relative to the path of movement of the vehicle, whereby the vessel is maintained substantially level during pitch and roll motion of the vehicle to afford separation of said coagulated protein from said deproteinized liquid.

14. Apparatus according to claim 12 wherein said deproteinized liquid applying means includes a manifold extending transversely below said vehicle, a plurality of spray heads depending from said manifold in spaced relation therealong, and conduit means connecting said holding tank means to said manifold.

15. Apparatus according to claim 11 wherein said separating means includes a macerator for shredding said harvested vegetation, a dewatering press associated with said macerator for expressing said liquid fraction from said fibrous fraction, and means connected between said macerator and said dewatering press for conveying said macerated vegetation from said macerator to said press.

16. Apparatus according to claim 15 wherein said macerator includes a die ring having a peripheral wall with a plurality of orifices extending outwardly therethrough, frame means supporting said die ring, bearing means around the periphery of said die ring wall mounting said die ring for rotation relative to said frame means, roller means in said die ring, means mounting said roller means for rotation in close proximity with said die ring wall, means for rotating said roller means, and means coupling said roller means to said die ring for causing said die ring to rotate with said roller means, whereby vegetation fed into the die ring is extruded through the orifices upon rotation of the rollers and die ring.

17. Apparatus according to claim 16 wherein said roller means includes a pair of rollers rotatable about axes parallel to the rotational axis of said die ring, said roller mounting means including bearing means mounted at diametrical locations to said frame means, and said coupling means including a spur gear rotatable with each roller and a ring gear rotatable with said die ring and engaging each spur gear, whereby rotation of the rollers causes the die ring to rotate in synchronism therewith.

18. Apparatus according to claim 17 including a conduit and blower assembly connecting said harvesting means to said macerator, and distributor means connecting said conduit to said macerator for charging harvested plants into said die ring at diametrical locations ahead of said rollers.

19. Apparatus according to claim 18 wherein said macerator includes a shroud surrounding said die ring, means providing an outlet in said shroud below said die ring, and impeller means disposed in said shroud and operable in response to rotation of said die ring to displace macerated plants toward said outlet.

20. Apparatus according to claim 15 wherein said dewatering press includes a pair of juxtaposed conical pressure members, frame means mounting said pressure members for rotation about obtusely-intersecting axes with their conical surfaces in confronting relation to provide a wide gap above their axes for receiving harvested vegetation and to provide a narrow gap below said axes for compressing the vegetation, deflector vane means disposed between said pressure members to expel pressed vegetation from between said pressure members upon rotation thereof, pan means disposed below said pressure members to collect liquid expressed from said vegetation, and means for rotating said pressure members about their axes.

21. Apparatus according to claim 20 wherein said pressure member mounting means includes a frame assembly having base means, a pair of strut assemblies projecting upwardly from said base means, a bearing extending around each pressure member inwardly adjacent its periphery, means mounting said bearing intermediate said pressure member and its associated strut assembly, hinge means mounting at least one strut assembly to pivot relative to said base means, and tie rod means releasably connecting the strut assemblies to maintain said pressure members in said operating relation while enabling said strut assembly to pivot and thereby afford access to the interior of said dewatering press.

22. Apparatus according to claim 21 wherein said pressure member rotating means includes a motor mounted to said strut assembly adjacent the periphery of each pressure member, a rotor mounted to said motor, drive means mounted on said pressure member adjacent its periphery, and means mechanically coupling said rotor to said drive means.

23. Apparatus according to claim 21 wherein each pressure member has means in its tapered surface for channeling fluid to its outer periphery, and including screen means overlying the tapered surface to prevent plant matter from clogging said channeling means.

* * * * *

UNITED STATES PATENT AND TRADEMARK OFFICE
CERTIFICATE OF CORRECTION

PATENT NO. : 4,109,448
DATED : August 29, 1978
INVENTOR(S) : Donald C. Kline

It is certified that error appears in the above-identified patent and that said Letters Patent are hereby corrected as shown below:

Column 15, line 30, after "liquid" insert --fraction--.

Signed and Sealed this

Twelfth Day of June 1979

[SEAL]

Attest:

RUTH C. MASON
Attesting Officer

DONALD W. BANNER
Commissioner of Patents and Trademarks